United States Patent
Matsui et al.

(10) Patent No.: US 11,167,264 B2
(45) Date of Patent: Nov. 9, 2021

(54) PACKING MATERIAL FOR LIQUID CHROMATOGRAPHY

(71) Applicant: SHOWA DENKO K.K., Tokyo (JP)

(72) Inventors: Toru Matsui, Kawasaki (JP); Junya Kato, Kawasaki (JP)

(73) Assignee: SHOWA DENKO K.K., Tokyo (JP)

( * ) Notice: Subject to any disclaimer, the term of this patent is extended or adjusted under 35 U.S.C. 154(b) by 931 days.

(21) Appl. No.: 15/556,384

(22) PCT Filed: Mar. 3, 2016

(86) PCT No.: PCT/JP2016/056654
§ 371 (c)(1),
(2) Date: Sep. 7, 2017

(87) PCT Pub. No.: WO2016/143673
PCT Pub. Date: Sep. 15, 2016

(65) Prior Publication Data
US 2018/0104669 A1    Apr. 19, 2018

(30) Foreign Application Priority Data
Mar. 10, 2015   (JP) .............................. JP2015-046650

(51) Int. Cl.
| | |
|---|---|
| *B01J 20/26* | (2006.01) |
| *B01J 20/291* | (2006.01) |
| *B01J 20/285* | (2006.01) |
| *B01D 15/34* | (2006.01) |
| *G01N 30/74* | (2006.01) |
| *G01N 30/88* | (2006.01) |

(52) U.S. Cl.
CPC ............ *B01J 20/267* (2013.01); *B01D 15/34* (2013.01); *B01J 20/285* (2013.01); *B01J 20/291* (2013.01); *G01N 30/74* (2013.01); *G01N 30/88* (2013.01); *B01J 2220/54* (2013.01)

(58) Field of Classification Search
CPC ....... B01J 20/267; B01D 15/34; G01N 30/74; G01N 30/88
See application file for complete search history.

(56) References Cited

U.S. PATENT DOCUMENTS

| | | | |
|---|---|---|---|
| 3,681,269 A | 8/1972 | Heitz et al. | |
| 4,246,362 A * | 1/1981 | Sasaki | .............. B01J 20/291 521/149 |
| 5,254,634 A | 10/1993 | Ito et al. | |
| 2009/0258428 A1 | 10/2009 | Okada et al. | |
| 2013/0231460 A1* | 9/2013 | Erbacher | .............. C12Q 1/6806 530/350 |

FOREIGN PATENT DOCUMENTS

| | | |
|---|---|---|
| CN | 1561357 A | 1/2005 |
| CN | 101035602 A | 9/2007 |
| CN | 101791490 A | 8/2010 |
| CN | 102059157 A | 5/2011 |
| CN | 102552201 A | 7/2012 |
| EP | 1232787 A1 | 8/2002 |
| JP | 54-160300 A | 12/1979 |
| JP | 60-70353 A | 4/1985 |
| JP | 60-104256 A | 6/1985 |
| JP | 63-066458 A | 3/1988 |
| JP | 63-92645 A | 4/1988 |
| JP | 64-025056 A | 1/1989 |
| JP | 04-081410 A | 3/1992 |
| JP | 2000-55897 A | 2/2000 |
| JP | 2002-181800 A | 6/2002 |
| JP | 2005-525576 A | 8/2005 |
| JP | 2013-514538 A | 4/2013 |
| WO | 03/098208 A1 | 11/2003 |
| WO | 2011/084506 A2 | 7/2011 |

OTHER PUBLICATIONS

Gunasena et al., J Sep Sci., (2011), v34, p. 2097-2105.*
Communication dated Sep. 26, 2018, from European Patent Office in counterpart application No. 16761643.2.
Communication dated Dec. 3, 2019 from Japanese Patent Office in JP Application No. 2017-505286.
Communication dated Apr. 1, 2019 from the State Intellectual Property of the P.R.C. in application No. 201680012988.0.
Communication dated Jun. 29, 2020, from the China National Intellectual Property Administration in application No. 201680012988.0.
International Search Report of PCT/JP2016/056654 dated May 31, 2016 [PCT/ISA/210].

* cited by examiner

*Primary Examiner* — Yong L Chu
(74) *Attorney, Agent, or Firm* — Sughrue Mion, PLLC (57) ABSTRACT

Provided is a packing material for liquid chromatography, including a gel obtained by polymerizing monomers including 40% by mass or more of a crosslinkable monomer having a (meth)acryloyloxy group.

13 Claims, 1 Drawing Sheet

PACKING MATERIAL FOR LIQUID CHROMATOGRAPHY

CROSS REFERENCE TO RELATED APPLICATIONS

This application is a National Stage of International Application No. PCT/JP2016/056654, filed Mar. 3, 2016 (claiming priority based on Japanese Patent Application No. 2015-046650, filed Mar. 10, 2015), the contents of which are incorporated herein by reference in their entirety.

BACKGROUND ART

A light scattering detector is a device for measuring Rayleigh scattered light from colloidal particles upon irradiation with laser light to a polymer solution. This device can output the absolute weight-average molecular weight or the rotation radius of a sample from the intensity of scattered light. A measurement method using a light scattering phenomenon has been widely used for characterization of polymers, that is, determination of the molecular weights or studies of the shapes of the polymers. Subjects to be evaluated are synthetic polymers, among which synthetic polymers soluble in an organic solvent have been focused. A cause thereof is that in a case of a polymer solution in which polymers are dissolved in an organic solvent, even when impurity particles or "foreign materials" interfering with light scattering measurements are present, they are easily removed. In addition, when the "foreign materials" are present, the baseline of a chromatogram becomes unstable, and thus, spike noise may be generated in some cases, which is thus not preferable.

As described above, a cause for which the baseline of a light scattering chromatogram becomes unstable or spike noise is generated is thought to be that dusts and/or ionic materials are present in an organic solvent, and the dusts and/or ionic materials are adsorbed onto a packing material in a column and leave due to a slight variation in pressure. As a method for suppressing spike noise, for example, a method for purifying a solvent, using a filter capable of filtering and removing dusts that are fine particles, is described in Patent document 1.

As described above, in the analysis using an organic solvent, gel permeation chromatography (hereinafter also referred to as gel permeation chromatography (GPC)) is used, and spike noise is successfully suppressed by purifying the solvent as described above.

On the other hand, in a case of analyzing a polymer dissolved in an aqueous solvent, gel filtration chromatography (hereinafter also referred to as GFC) is used. Further, in a case of carrying out the characterization of a polymer with a light scattering detector using GFC, there is a tendency that spike noise is more easily generated than a case of GPC.

A cause for which the spike noise is generated is thought to be that impurities included in the packing material for liquid chromatography remain at the time of carrying out GFC. As the packing material for liquid chromatography, a gelled polymer substrate is used. However, in a case where the gelation does not completely proceed, unreacted oligomers reside within the gel. It can be envisioned that these unreacted oligomers are slightly eluted by an eluent and cause noise at the time of performing analysis using a light scattering detector.

Specifically, in GFC using a packing material for liquid chromatography in the related art, there have been cases where relatively low-molecular-weight oligomers having a methacryloyloxy group are detected when the eluted filtered liquid is recovered and subjected to analysis using an infrared spectrophotometer.

CITATION LIST

Patent Document

Patent document 1: Japanese Unexamined Patent Application, First Publication No. 2002-181800

SUMMARY OF INVENTION

Problem to be Solved by the Invention

The present invention provides a packing material for liquid chromatography, in which spike noise is hardly generated when a light scattering detector is used in size exclusion liquid chromatography (SEC: Size Exclusion Chromatography), and an analysis method using the same.

Means for Solving the Problems

The present inventors have accomplished a significant reduction in spike noise by using a gel having an increased degree of crosslinking as a packing material for liquid chromatography, thereby completing the present invention. For example, the present invention includes the following aspects.

[1] A packing material for liquid chromatography, which is made of a gel obtained by polymerizing monomers including 40% by mass or more of a crosslinkable monomer having a (meth)acryloyloxy group.

[2] The packing material for liquid chromatography as described in [1], in which the crosslinkable monomer having a (meth)acryloyloxy group is at least one selected from the group consisting of an ester of a (poly)alkylene glycol and a (meth)acrylic acid, an ester of a glycerin and a (meth)acrylic acid, and an ester of a pentaerythritol and a (meth)acrylic acid.

[3] The packing material for liquid chromatography as described in [2], in which the ester of a (poly)alkylene glycol and a (meth)acrylic acid is a compound represented by the general formula (1):

(in the formula, $R^1$ and $R^2$ each independently represent a hydrogen atom or a methyl group, n represents an integer of 1 to 14, and X represents an oxyalkylene group having 2 to 4 carbon atoms).

[4] The packing material for liquid chromatography as described in [2], in which the ester of a glycerin and a (meth)acrylic acid is a compound represented by the general formula (2):

(2)

(in the formula, $R^3$, $R^4$, and $R^5$ each independently represent a (meth)acryloyloxy group or a hydroxyl group, and at least two of $R^3$, $R^4$, and $R^5$ are each a (meth) acryloyloxy group).

[5] The packing material for liquid chromatography as described in [2], in which the ester of a pentaerythritol and a (meth)acrylic acid is a compound represented by the general formula (3):

(3)

(in the formula, $R^6$ represents a (meth)acryloyloxy group or a hydroxyl group, and $R^7$ represents a hydrogen atom or a methyl group).

[6] The packing material for liquid chromatography as described in any one of [1] to [5], in which the monomers further include a non-crosslinkable monomer which is a compound having one ethylenic double bond in the molecule thereof, in addition to the crosslinkable monomer having a (meth)acryloyloxy group. [7] The packing material for liquid chromatography as described in [6], in which the non-crosslinkable monomer is a compound represented by the general formula (4):

(4)

(in the formula, $R^8$ represents a hydrogen atom or a methyl group, and Y represents a monovalent organic group having an oxyalkylene group or a glycidyl group).

[8] A size exclusion liquid chromatography including introducing a sample capable of being dissolved in an aqueous solvent into a column filled with a packing material for liquid chromatography to perform detection using a light scattering detector, in which the packing material is made of a gel obtained by polymerizing monomers including 40% by mass or more of a crosslinkable monomer.

[9] The packing material for liquid chromatography as described in any one of [1] to [7], in which the gel is a porous polymer gel and the volume-average particle diameter of the packing material is 1 to 500 microns.

[10] The packing material for liquid chromatography as described in any one of [1] to [7], and [9], in which the gel is a polymer gel including 40% by mass or more of a monomer unit derived from the crosslinkable monomer having a (meth)acryloyloxy group.

[11] The packing material for liquid chromatography as described in any one of [1] to [7], [9], and [10], in which the crosslinkable monomer is a compound having two or more ethylenic double bonds in the molecule thereof, the gel is a hydrophilic gel, and the content of the crosslinkable monomer is 50% by mass or more.

[12] The packing material for liquid chromatography as described in any one of [1] to [7], and [9] to [11], in which the crosslinkable monomer includes at least one selected from the group consisting of pentaerythritol tri(meth)acrylate, pentaerythritol tetra(meth)acrylate, ethylene glycol dimethacrylate, glycerin dimethacrylate, polyethylene glycol #200 diacrylate, and polyethylene glycol #200 dimethacrylate.

[13] A liquid chromatography device including the packing material for liquid chromatography as described in any one of [1] to [7], and [9] to [12], a column including the packing material, a pump which transports a liquid to the column, a detector which analyzes the components eluted from the column, and a device which processes the data detected from the detector.

Advantageous Effects of Invention

By using the packing material for liquid chromatography of the present invention, the analysis is hardly affected by spike noise even in a case of analysis using a water-soluble polymer such as pullulan and polyethylene glycol (hereinafter also referred to as a PEG) as a sample, and measurement can be performed at a high S/N ratio (signal/noise) in size exclusion liquid chromatography using a light scattering detector.

BEST MODE FOR CARRYING OUT THE INVENTION

Hereinafter, preferred examples of the present invention will be described, but the present invention is not limited to these examples. While not departing from the spirit of the present invention, additions, omissions, substitutions, combinations, and other modifications of configurations may be made.

The present invention relates to a packing material for liquid chromatography. The present invention relates to preferably a packing material for liquid chromatography which is suitable for size exclusion liquid chromatography for a light scattering detector, and more preferably a packing material for aqueous gel permeation chromatography, with which a light scattering chromatogram having a stable baseline and low spike noise can be achieved in the analysis using a light scattering detector.

The packing material for liquid chromatography of the present invention is a packing material for liquid chromatography, including a gel (polymer gel) obtained by polymerizing monomers including 40% by mass or more of a crosslinkable monomer having a (meth)acryloyloxy group. That is, a crosslinkable monomer having a (meth)acryloyloxy group accounts for 40% by mass or more of the gel which is a polymer.

In the present application, a (meth)acryloyloxy group means at least one selected from an acryloyloxy group and a methacryloyloxy group. A (meth)acryloyl group refers to at least one selected from an acryloyl group and a methacryloyl group. A (meth)acrylic acid means at least one selected from an acrylic acid and a methacrylic acid. A (meth)acrylate means at least one selected from an acrylate and a methacrylate. Further, a (poly)alkylene glycol refers to an alkylene glycol or a polyalkylene glycol. Further, a crosslinkable monomer is a compound having two or more ethylenic double bonds in the molecule thereof, and a non-crosslinkable monomer means a compound having one ethylenic double bond in the molecule thereof.

The crosslinkable monomer having a (meth)acryloyloxy group is preferably at least one selected from the group consisting of an ester of a (poly)alkylene glycol and a (meth)acrylic acid, an ester of a glycerin and a (meth)acrylic acid, and an ester of a pentaerythritol and a (meth)acrylic acid.

As the ester of a (poly)alkylene glycol and a (meth)acrylic acid, a compound represented by the general formula (1) can be preferably exemplified.

(1)

(in the formula, $R^1$ and $R^2$ each independently represent a hydrogen atom or a methyl group, n represents an integer of 1 to 14, and X represents an oxyalkylene group having 2 to 4 carbon atoms).

Specific examples of the ester of a (poly)alkylene glycol and a (meth)acrylic acid include ethylene glycol di(meth)acrylate, polyethylene glycol di(meth)acrylate, polyethylene glycol #200 di(meth)acrylate, polyethylene glycol #400 di(meth)acrylate, polyethylene glycol #600 di(meth)acrylate, polypropylene glycol di(meth)acrylate, neopentyl glycol di(meth)acrylate, 1,9-nonanediol di(meth)acrylate, tricyclodecanedimethylol di(meth)acrylate, and trimethylolpropane tri(meth)acrylate, which may be used alone or in combination thereof.

Among these, ethylene glycol di(meth)acrylate and polyethylene glycol di(meth)acrylate are preferable from the viewpoint that they are easily copolymerized with other ethylenic double bond-containing compounds.

As the ester of a glycerin and a (meth)acrylic acid, a compound represented by the general formula (2) can be preferably exemplified.

(2)

(in the formula, $R^3$, $R^4$, and $R^5$ each independently represent a (meth)acryloyloxy group or a hydroxyl group, and at least two of $R^3$, $R^4$, and $R^5$ are each a (meth)acryloyloxy group).

Specific examples of the ester of a glycerin and a (meth)acrylic acid include glycerin di(meth)acrylate, glycerin tri(meth)acrylate, and glycerin methacrylate acrylate, which may be used alone or in combination thereof.

Among these, glycerin di(meth)acrylate is preferable from the viewpoint that it is easily copolymerized with another ethylenic double bond-containing compound.

As the ester of a pentaerythritol and a (meth)acrylic acid, a compound represented by the general formula (3) can be preferably exemplified.

(3)

(in the formula, $R^6$ represents a (meth)acryloyloxy group or a hydroxyl group, and $R^7$ represents a hydrogen atom or a methyl group).

Specific examples of the ester of a pentaerythritol and a (meth)acrylic acid include pentaerythritol tri(meth)acrylate and pentaerythritol tetra(meth)acrylate, which may be used alone or in combination thereof.

Among these, pentaerythritol tri(meth)acrylate is preferable from the viewpoint that it is easily copolymerized with another ethylenic double bond-containing compound, and easily provides hydrophilicity.

In order to obtain a gel by polymerizing monomers including 40% by mass or more of a crosslinkable monomer having a (meth)acryloyloxy group, the gel can be produced by, for example, preparing monomers which include 40% by mass or more of a crosslinkable monomer having a (meth)acryloyloxy group with respect to all the monomers blended, and polymerizing or copolymerizing these under the condition which will be described later, thereby obtaining a polymer or a copolymer. The obtained polymer or copolymer preferably has a mesh structure or a three-dimensional network structure. In the present invention, the content in % by mass of the crosslinkable monomer having a (meth)acryloyloxy group with respect to all the monomers as a raw material when a gel is generated is referred to a degree of crosslinking.

The degree of crosslinking in the present invention is 40% by mass or more, whereby a high S/N ratio in a light scattering detector can be realized. The degree of crosslinking is preferably 45% by mass or more, more preferably 50% by mass or more, and still more preferably 60% by mass or more. The degree of crosslinking of 75% by mass or more is also preferable, and the degree of crosslinking of 90% by mass or more is also preferable. It is thought that the presence of unreacted oligomers remaining during the production of the gel has an influence on the S/N ratio, and it is also thought that an increase in the degree of crosslinking reduces the amount of the unreacted oligomers present, and thus leads to an increase in the S/N ratio. The upper limit of the degree of crosslinking can be arbitrarily selected and can be selected to be 100% by mass or less, 95% by mass or less, 90% by mass or less, 80% by mass or less, or the like, as desired. As long as the effects of the present invention can be obtained, the upper limit can be selected arbitrarily.

Incidentally, the obtained polymer or copolymer (polymer gel) becomes a polymer depending on the degree of crosslinking, for example, becomes a polymer preferably including 40% by mass or more of a monomer unit derived from a crosslinkable monomer having a (meth)acryloyloxy group when the degree of crosslinking is 45% by mass or more.

Within a range where the S/N ratio is not reduced when the gel is produced, copolymerization can be performed using a crosslinkable monomer having a (meth)acryloyloxy group and a common-crosslinkable monomer which is copolymerizable with the crosslinkable monomer having a (meth)acryloyloxy group.

Examples of the non-crosslinkable monomer include a compound having one vinyl group in the molecule thereof, a compound having one (meth)acryloyl group in the molecule thereof, and a compound having one (meth)acryloyloxy group in the molecule thereof.

(4)

(in the formula, $R^8$ represents a hydrogen atom or a methyl group, and Y represents a monovalent organic group having an oxyalkylene group or a glycidyl group).

Specifically, in addition to the compound represented by the general formula (4) or the other compounds, the examples thereof include glycidyl (meth)acrylate, 4-hydroxybutyl (meth)acrylate, methoxy polyethylene glycol #400 acrylate, and 4-hydroxybutyl (meth)acrylate glycidyl ether, styrene, styrene sulfonic acid (soda), vinyl acetate, (meth)acrylic acid (soda), alkyl (meth)acrylate, benzyl (meth)acrylate, N,N-dimethylaminoethyl (meth)acrylate, (meth)acrylamide, N-methyl (meth)acrylamide, N,N-dimethyl (meth)acrylamide, N-isopropyl (meth)acrylamide, acrylamide propane sulfonic acid (soda), acryloyl morpholine, N-vinyl pyrrolidone, N-vinyl formamide, N-vinyl acetamide, N-vinyl carbazole, acrylonitrile, methyl vinyl ether, ethyl vinyl ether, butyl vinyl ether, cyclohexyl vinyl ether, 2-acrylamide-2-methylpropane sulfonic acid, maleic anhydride, maleimide, N-alkyl maleimide, and N-phenylmaleimide, which may be used alone or in combination of two or more kinds thereof. Among these, glycidyl (meth)acrylate is preferable from the viewpoint that the hydrophilicity of the gel is improved due to production of hydroxyl groups. The amount of the non-crosslinkable monomer can be selected from, for example, a range of 0% or more and less than 60% by mass, and the non-crosslinkable monomer can be used in an arbitrary amount of 0% to 50% by mass, 10% to 50% by mass, 20% to 45% by mass, and the like. The amount of the monomer unit derived from the non-crosslinkable monomer in the polymer gel of the present invention can be preferably selected from a range of 0% or more and less than 60%, and can be selected from a preferred range such as of 0% to 50%, 10% to 50%, and 20% to 45%, as desired.

The gel is preferably porous. In order to obtain porosity, it is preferable to blend a diluent as a porosity forming agent into the monomer during the polymerization.

As the diluent, an organic solvent which can dissolve monomers as a raw material and can be uniformly mixed with the monomers as a raw material under the reaction condition, but cannot dissolve a polymer formed of the monomers and is inert to a polymerization reaction can be used. Such an organic solvent varies depending on the kind of the monomers, and can be arbitrarily selected. However, for example, aromatic hydrocarbons such as toluene, xylene, diethyl benzene, and dodecyl benzene; saturated hydrocarbons such as hexane, heptane, octane, and decane; alcohols such as isoamyl alcohol, hexyl alcohol, and octyl alcohol; aliphatic halogenated hydrocarbons such as dichloromethane, dichloroethane, and trichloroethane; aliphatic or aromatic esters such as ethyl acetate, butyl acetate, dimethyl phthalate, and diethyl phthalate; or the like can be used. The amount of the diluent to be blended varies depending on the kind of the monomers, the size of the pores of a desired porous crosslinked polymer, the density or kind thereof, and the like and cannot thus be determined simply, but the amount can be selected, as desired. For example, it is preferable that the diluent is usually mixed in an amount of 50 to 200 parts by mass with respect to 100 parts by mass of the monomers as a raw material to perform polymerization.

The gel of the present invention can be obtained by a general method per se known in the art, that is, for example, a solution polymerization method or a suspension polymerization method, in the presence of a polymerization initiator. Further, a gel in the state where the polymer or copolymer includes a solvent such as water can be generated, but a dried gel obtained by excluding the solvent therefrom may be generated. The polymerization initiator may be any one as long as it becomes a radical generating source. Examples thereof include benzoyl peroxide, acetyl peroxide, lauroyl peroxide, t-butyl hydroperoxide, cumene hydroperoxide, isobutyryl peroxide, dicumyl peroxide, t-butylperoxy benzoate, t-butylperoxy isopropyl carbonate, ammonium persulfate, potassium persulfate, azobisisobutyronitrile, azobis-2-4-dimethylvaleronitrile, azobiscyclohexanecarbonitrile, azobis-2-amidinopropane dihydrochloride, azobis[2-(2-imidazolin-2-yl)propane]dihydrochloride, and azobis[2-methyl-N-(2-hydroxyethyl)propionamide], and examples of a photo-radical polymerization initiator include 2,4-diethylthioxanthone, benzophenone, 4-dimethylaminoisoamylbenzoate, and 4-dimethylaminoethylbenzoate. As for the addition amounts thereof, an arbitrary amount can be used, and for example, an amount of usually 0.01 to 30 parts by mass, and preferably 0.05 to 20 parts by mass, with respect to 100 parts by mass of all the monomers, is used.

In the solution polymerization, polymerization can be performed, for example, by putting an aqueous solution in which a crosslinkable monomer having a (meth)acryloyloxy group, a non-crosslinkable monomer as desired, and a polymerization initiator are added into a reaction container, purging the container with nitrogen, and performing polymerization at a temperature of, for example, 40° C. to 100° C. After the reaction, a hydrogel is obtained.

Moreover, in the suspension polymerization, polymerization can be performed, for example, by dispersing a solution which is obtained by blending a crosslinkable monomer having a (meth)acryloyloxy group, a non-crosslinkable monomer as desired, a diluent and a polymerization initiator, in an aqueous solution having a dispersion stabilizer dissolved therein in a reaction container equipped with a stirrer to form particles having a predetermined particle diameter, purging the container with nitrogen and performing polymerization at a temperature of 40° C. to 100° C. Here, a particulate hydrogel is obtained. Further, a powdery gel is obtained if dehydration is performed using azeotropic dehydration or the like. In this case, gelatin, a polyvinyl alcohol, a saponified product of a polyvinyl alcohol, a water-soluble polymer compound such as hydroxyethyl cellulose, various surfactants such as an anionic surfactant, a cationic surfactant, and a nonionic surfactant, and a poorly water-soluble inorganic salt such as calcium carbonate and calcium phosphate can be used as a dispersion stabilizer. In order to suppress the dissolution of the monomers in water, water-soluble inorganic salts such as sodium chloride, calcium chloride, and potassium sulfate can be used as a salting-out agent, in combination with these dispersion stabilizers. The obtained particulate gel is washed with water or hot water, and with an organic solvent, as desired, to remove the dispersion stabilizers attached to the gel, the diluent and unreacted monomers present in the gel, and the like. Further, by classifying the particulate gel, as desired, it is possible to arrange the particle diameters. The volume-average particle diameter can be selected arbitrarily, and is usually 1 to 500 microns, and preferably 2 to 200 microns. A preferred range of the volume-average particle diameter can be selected, as desired, and the preferred range may be selected arbitrarily from, for example, 1 to 100 microns, 1 to 50 microns, 1 to 20 microns, or the like.

The above volume-average particle diameter in the present invention can be measured in the following manner, using a Coulter counter method. That is, using Multisizer 4 (manufactured by Beckman Coulter, Inc.) as a measuring device, 25 mL of ISOTON (diluent) is added to 0.2 g of the obtained polymer packing material, and dispersed by applying ultrasonic waves for 3 minutes, and then the volume-average particle diameter of about 1,000 measurement particles is measured. In order to adjust the volume-average particle diameter to be within a preferred range, the particle diameter can be controlled by air classification, classification by sieving, classification using sedimentation, or the like.

The porous gel thus obtained is preferably hydrophilic, and preferably has a hydroxyl group. Accordingly, in a case where the crosslinkable monomer having a (meth)acryloyloxy group which is used at the time of the production of a gel does not have a hydrophilic group such as a hydroxyl group, it is preferable that the gel is produced by performing copolymerization with a non-crosslinkable monomer having a glycidyl group to provide an epoxy group for the gel. In such a case, the epoxy group contained in the gel and a polyol such as ethylene glycol are preferably reacted with each other in the presence of a catalyst such as a boron trifluoride-diethyl ether complex, whereby the epoxy group is ring-opened and a hydroxyl group is produced, thereby making it possible to provide hydrophilicity. Further, the produced hydroxyl group may be reacted with an epoxy compound, and preferably glycidol to increase the number of hydroxyl groups. Thus, a porous gel with a structure having both properties in that the outer surface of the particulate gel is covered with alcoholic hydroxyl groups, whereas the inside of the pore of the particulate gel is hydrophobic is obtained. As a result, the hydrophilicity of the outer surface is enhanced, and thus, and such hydrophilicity can prevent proteins or the like from being adsorbed or held onto to the gel.

The reaction of a hydroxyl group contained in the gel with an epoxy compound, in particular, glycidol, may be performed by dispersing and mixing the gel with the glycidol, and the reaction can increase the number of hydroxyl groups of the gel. A mixing and dispersing method can be carried out by a method in which the gel is dispersed and mixed in a solution of glycidol alone or a glycidol solution having glycidol dissolved in an organic solvent compatible with the glycidol; a method in which the gel is dispersed and mixed with an organic solvent compatible with glycidol and glycidol is further added to the mixture; or the like. The method for adding glycidol is not particularly limited, and may be any one of, for example, a method in which glycidol is added at once, a method in which glycidol is added in several divided times, a method in which glycidol is added dropwise, and a method in which glycidol is dissolved in another organic solvent and then the solution is added at once or in divided times. The organic solvent compatible with glycidol is not particularly limited as long as it can have the particles mixed with or dispersed therein and is inert to a reaction between a functional group contained in the particles and an epoxy group of glycidol. Examples of the organic solvent include dimethylformamide, dioxane, and diethylene glycol dimethyl ether.

For the reaction between the glycidol and a hydroxyl group contained in the gel, a catalyst can be appropriately used, as desired. Examples of the catalyst include strong inorganic acids such as hydrochloric acid and sulfuric acid, strong alkalis such as sodium hydroxide and potassium hydroxide, quaternary ammonium salts such as triethylbenzylammonium chloride and tetramethylammonium chloride, tertiary amines such as benzyl dimethylamine and tributylamine, imidazole compounds such as 2-methyl-4-ethylimidazole and 2-methylimidazole, and Lewis acids such as boron trifluoride, zinc fluoroborate, and tin chloride.

The packing material for liquid chromatography of the present invention obtained as described can be preferably used in a liquid chromatography method and a liquid chromatography device. By using the packing material of the present invention in a column, for example, in a liquid chromatography device including the column, a pump for transporting a liquid to the column, a detector for analyzing the components eluted from the column, and a device for processing the data detected from the detector, measurement can be performed at a high S/N ratio.

EXAMPLES

Hereinafter, the present invention will be more specifically described, based on Examples, but the present invention is not intended to be limited to these Examples.

[Example 1] (Degree of Crosslinking: 100%)

56.0 g of a crosslinkable monomer (A-TMM-3L, manufactured by Shin-Nakamura Chemical Co., Ltd., 55% by mass (103.3 mmol) of pentaerythritol triacrylate, 45% by mass (71.3 mmol) of pentaerythritol tetraacrylate), 67.6 g of dichloroethane as a diluent, and 36.4 g of octanol were put into a container, 3.3 g (13.3 mmol) of 2,2'-azobis(2,4-dimethylvaleronitrile) as a polymerization initiator was dissolved therein, and the solution was stirred for 1 hour to prepare an oil phase. Further, separately, an aqueous phase in which 300 g of ion exchange water, 8 g of GH-20 (a dispersion stabilizer, manufactured by Nippon Synthetic Chemical Co., Ltd., a polyvinyl alcohol with a degree of saponification of 86.5% to 89.0%), and 8 g of NaCl as a salting out agent had been dissolved was prepared. The oil phase was added to the aqueous phase, and the mixed phase was dispersed for 10 minutes at 2,000 rpm by an Excel Auto Homogenizer (manufactured by Nippon Seiki Seisakusho). Thereafter, the dispersion liquid was transferred to a separable flask, and then the reaction container was purged with nitrogen. Polymerization thereof was performed at a reaction temperature of 60° C. for 6 hours. Then, the dispersion liquid which had been subjected to polymerization was filtered, washed, and dried to obtain 59.0 g of a gel. The obtained gel was classified by a wind power classifier to collect particles having a size of 4 to 8 μm, thereby obtaining 22.2 g of the gel of the present invention.

[Example 2] (Degree of Crosslinking: 60%)

41.3 g of a crosslinkable monomer (A-TMM-3L, manufactured by Shin-Nakamura Chemical Co., Ltd., 55% by mass (76.2 mmol) of pentaerythritol triacrylate, 45% by mass (52.6 mmol) of pentaerythritol tetraacrylate), 27.5 g (193.5 mmol) of glycidyl methacrylate as a non-crosslinkable monomer, 67.6 g of dichloroethane, and 36.4 g of octanol were put into a container, 3.3 g (13.3 mmol) of 2,2'-azobis(2,4-dimethylvaleronitrile) was dissolved therein, and the solution was stirred for 1 hour to prepare an oil phase. Further, separately, an aqueous phase in which 300 g of ion exchange water, 8 g of GH-20 as a dispersion stabilizer, and 8 g of NaCl had been dissolved was prepared. The oil phase was added to the aqueous phase, and the mixed phase was dispersed for 10 minutes at 2,000 rpm by an Excel Auto Homogenizer. Thereafter, the dispersion liquid was transferred to a separable flask, and then the reaction container was purged with nitrogen. Polymerization thereof was performed at a reaction temperature of 60° C. for 6 hours. Then, the dispersion liquid which had been subjected to polymerization was filtered, washed, and dried to obtain 63.7 g of a gel. The obtained gel was dispersed in a mixed liquid of 220 g of diethylene glycol dimethyl ether and 220 g of ethylene glycol, and the dispersion liquid was stirred for 1 hour. After stirring, 2.6 g of a boron trifluoride-diethyl ether complex as a catalyst was added thereto and the mixture was reacted at 80° C. for 3 hours. The mixture was filtered, washed, and dried to obtain 67.0 g of a gel. The obtained gel was classified by a wind power classifier to collect particles in a size of 4 to 8 Lm. 20.8 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 22.8 g of the gel of the present invention.

[Example 3] (Degree of Crosslinking: 47%)

29.7 g of a crosslinkable monomer (A-TMM-3L, manufactured by Shin-Nakamura Chemical Co., Ltd., 55% by mass (54.8 mmol) of pentaerythritol triacrylate, 45% by mass (37.8 mmol) of pentaerythritol tetraacrylate), 33.1 g (232.9 mmol) of glycidyl methacrylate, 67.6 g of dichloroethane, and 36.4 g of octanol were put into a container, 3.3 g (13.3 mmol) of 2,2'-azobis(2,4-dimethylvaleronitrile) was dissolved therein, and the solution was stirred for 1 hour to prepare an oil phase. Further, separately, an aqueous phase in which 300 g of ion exchange water, 8 g of GH-20, and 8 g of NaCl had been dissolved was prepared. The oil phase was added to the aqueous phase, and the mixed phase was dispersed for 10 minutes at 2,000 rpm by an Excel Auto Homogenizer. Thereafter, the dispersion liquid was transferred to a separable flask, and the reaction container was purged with nitrogen. Polymerization was performed at a reaction temperature of 60° C. for 6 hours. Then, the dispersion liquid which had been subjected to polymerization was filtered, washed, and dried to obtain 57.3 g of a gel. The obtained gel was dispersed in a mixed liquid of 220 g of diethylene glycol dimethyl ether and 220 g of ethylene glycol, and the dispersion liquid was stirred for 1 hour. After stirring, 2.6 g of a boron trifluoride-diethyl ether complex was added thereto and the mixture was reacted at 80° C. for 3 hours. The mixture was filtered, washed, and dried to obtain 61.3 g of a gel. The obtained gel was classified by a wind power classifier to collect particles in a size of 4 to 8 μm. 18.7 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 20.2 g of the gel of the present invention.

[Comparative Example 1] (Degree of Crosslinking: 30%)

16.8 g of a crosslinkable monomer (A-TMM-3L, manufactured by Shin-Nakamura Chemical Co., Ltd., 55% by mass (31.0 mmol) of pentaerythritol triacrylate, 45% by mass (21.4 mmol) of pentaerythritol tetraacrylate), 39.2 g (275.8 mmol) of glycidyl methacrylate, 67.6 g of dichloroethane, and 36.4 g of octanol were put into a container, 2.2 g (13.3 mmol) of azobisisobutyronitrile was dissolved therein, and the solution was stirred for 1 hour to prepare an oil phase. Further, separately, an aqueous phase in which 300 g of ion exchange water, 8 g of GH-20, and 8 g of NaCl had been dissolved was prepared. The oil phase was added to the aqueous phase, and the mixed phase was dispersed for 10 minutes at 2,000 rpm by an Excel Auto Homogenizer. Thereafter, the dispersion liquid was transferred to a separable flask, and then the reaction container was purged with nitrogen. Polymerization thereof was performed at a reaction temperature of 60° C. for 6 hours. Then, the dispersion liquid which had been subjected to polymerization was filtered, washed, and dried to obtain 50.4 g of a gel. The obtained gel was dispersed in a mixed liquid of 220 g of diethylene glycol dimethyl ether and 220 g of ethylene glycol, and the dispersion liquid was stirred for 1 hour. After stirring, 2.6 g of a boron trifluoride-diethyl ether complex was added thereto and the mixture was reacted at 80° C. for 3 hours. The mixture was filtered, washed, and dried to obtain 53.3 g of a gel. The obtained gel was classified by a wind power classifier to collect particles in a size of 4 to 8 μm. 15.7 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 16.4 g of the gel of the present invention.

[Comparative Example 2] (Degree of Crosslinking: 30%)

19.8 g (99.9 mmol) of ethylene glycol dimethacrylate as a crosslinkable monomer, 46.2 g (323.6 mmol) of glycidyl methacrylate as a non-crosslinkable monomer, 28 g of chlorobenzene as a diluent, and 30 g of lauryl alcohol were put into a container, 4.0 g (16.1 mmol) of 2,2'-azobis(2,4-dimethylvaleronitrile) was dissolved therein, and the solution was stirred for 1 hour to prepare an oil phase. Further, separately, an aqueous phase in which 440 g of ion exchange water, 2.20 g of GH-20, 2.20 g of KH-17 (a dispersion stabilizer, manufactured by Nippon Synthetic Chemical Co., Ltd., a polyvinyl alcohol with a degree of saponification of 78.5% to 81.5%), and 4.40 g of NaCl had been dissolved was prepared. The oil phase was added to the aqueous phase, and the mixed phase was dispersed for 10 minutes at 3,500 rpm by an Excel Auto Homogenizer. Thereafter, the dispersion liquid was transferred to a separable flask, and then the reaction container was purged with nitrogen. Polymerization thereof was performed at a reaction temperature of 60° C. for 6 hours. The product was filtered, washed, and dried to obtain 60.0 g of a gel. 400 g of water and 6 g of sulfuric acid were added to the obtained gel, and the mixture was reacted at 80° C. for 3 hours. The mixture was filtered, washed, and dried to obtain 64.5 g of a gel. The obtained gel was classified by a wind power classifier to collect particles in a size of 8 to 12 μm. 24.6 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 26.6 g of the gel of the present invention.

[Example 4] (Degree of Crosslinking: 40%)

26.4 g (133.2 mmol) of ethylene glycol dimethacrylate, 39.6 g (278.6 mmol) of glycidyl methacrylate, 28 g of chlorobenzene, and 30 g of lauryl alcohol were put into a container, 4.0 g (16.1 mmol) of 2,2'-azobis(2,4-dimethylvaleronitrile) was dissolved therein, and the solution was stirred for 1 hour to prepare an oil phase. Further, separately, an aqueous phase in which 440 g of ion exchange water, 2.20 g of GH-20, 2.20 g of (KH-17, and 4.40 g of NaCl had been dissolved was prepared. The oil phase was added to the aqueous phase, and the mixed phase was dispersed for 10 minutes at 3,500 rpm by an Excel Auto Homogenizer. Thereafter, the dispersion liquid was transferred to a separable flask, and the reaction container was purged with nitrogen. Polymerization was performed at a reaction temperature of 60° C. for 6 hours. The product was filtered, washed, and dried to obtain 62.5 g of a gel. 400 g of water and 6 g of sulfuric acid were added to the obtained gel, and the mixture was reacted at 80° C. for 3 hours. The mixture was filtered, washed, and dried to obtain 64.8 g of a gel. The obtained gel was classified by a wind power classifier to collect particles in a size of 8 to 12 μm. 25.6 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 27.3 g of the gel of the present invention.

[Example 5] (Degree of Crosslinking: 50%)

33.0 g (166.5 mmol) of ethylene glycol dimethacrylate, 33.0 g (232.1 mmol) of glycidyl methacrylate, 28 g of chlorobenzene, and 30 g of lauryl alcohol were put into a container, 4.0 g (16.1 mmol) of 2,2'-azobis(2,4-dimethylvaleronitrile) was dissolved therein, and the solution was stirred for 1 hour to prepare an oil phase. Further, separately, an aqueous phase in which 440 g of ion exchange water, 2.20 g of GH-20, 2.20 g of (KH-17, and 4.40 g of NaCl had been dissolved was prepared. The oil phase was added to the aqueous phase, and the mixed phase was dispersed for 10 minutes at 3,500 rpm by an Excel Auto Homogenizer. Thereafter, the dispersion liquid was transferred to a separable flask, and the reaction container was purged with nitrogen. Polymerization was performed at a reaction temperature of 60° C. for 6 hours. The product was filtered, washed, and dried to obtain 66.6 g of a gel. 400 g of water and 6 g of sulfuric acid were added to the obtained gel, and the mixture was reacted at 80° C. for 3 hours. The mixture was filtered, washed, and dried to obtain 71.3 g of a gel. The obtained gel was classified by a wind power classifier to collect particles in a size of 8 to 12 μm. 28.6 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 30.4 g of the gel of the present invention.

[Example 6] (Degree of Crosslinking: 60%)

39.6 g (173.7 mmol) of glycerin dimethacrylate as a crosslinkable monomer, 26.4 g (185.7 mmol) of glycidyl methacrylate, 18 g of chlorobenzene, and 38 g of lauryl alcohol were put into a container, 2.2 g (8.9 mmol) of 2,2'-azobis(2,4-dimethylvaleronitrile) was dissolved therein, and the solution was stirred for 1 hour to prepare an oil phase. Further, separately, an aqueous phase in which 440 g of ion exchange water, 2.20 g of GH-20, 2.20 g of KH-17, and 4.40 g of NaCl had been dissolved was prepared. The oil phase was added to the aqueous phase, and the mixed phase was dispersed for 5 minutes at 3,000 rpm by an Excel Auto Homogenizer. Thereafter, the dispersion liquid was transferred to a separable flask, and the reaction container was purged with nitrogen. Polymerization was performed at a reaction temperature of 60° C. for 6 hours. Then, the dispersion liquid was filtered, washed, and dried to obtain 57.2 g of a gel. 400 g of water and 6 g of sulfuric acid were added to the obtained gel, and the mixture was reacted at 80° C. for 3 hours. The mixture was filtered, washed, and dried to obtain 63.5 g of a gel. The obtained gel was classified by a wind power classifier to collect particles in a size of 10 to 12 μm. 25.6 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 26.8 g of the gel of the present invention.

[Example 7] (Degree of Crosslinking: 60%)

39.6 g of a crosslinkable monomer (A-TMM-3L, manufactured by Shin-Nakamura Chemical Co., Ltd., 55% by mass (73.1 mmol) of pentaerythritol triacrylate, 45% by mass (50.4 mmol) of pentaerythritol tetraacrylate), 39.6 g (173.7 mmol) of pentaerythritol triacrylate, 26.4 g (185.7 mmol) of glycidyl methacrylate, 18 g of chlorobenzene, and 38 g of lauryl alcohol were put into a container, 3.3 g (13.3 mmol) of 2,2'-azobis(2,4-dimethylvaleronitrile) was dissolved therein, and the solution was stirred for 1 hour to prepare an oil phase. Further, separately, an aqueous phase in which 440 g of ion exchange water, 2.20 g of GH-20, 2.20 g of KH-17, and 4.40 g of NaCl had been dissolved was prepared. The oil phase was added to the aqueous phase, and the mixed phase was dispersed for 10 minutes at 3,000 rpm by an Excel Auto Homogenizer. Thereafter, the dispersion liquid was transferred to a separable flask, and the reaction container was purged with nitrogen. Polymerization was performed at a reaction temperature of 60° C. for 6 hours. Then, the dispersion liquid which had been subjected to polymerization was filtered, washed, and dried to obtain 58.2 g of a gel. 400 g of water and 6 g of sulfuric acid were added to the obtained gel, and the mixture was reacted at 80° C. for 3 hours. The mixture was filtered, washed, and dried to obtain 63.5 g of a gel. The obtained gel was classified by a wind power classifier to collect particles in a size of 8 to 12 μm. 25.8 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 27.3 g of the gel of the present invention.

[Example 8] (Degree of Crosslinking: 60%)

41.3 g (134.1 mmol) of polyethylene glycol #200 diacrylate (manufactured by Shin-Nakamura Chemical Co., Ltd.) as a crosslinkable monomer, 27.5 g (193.5 mmol) of glycidyl methacrylate, 67.6 g of dichloroethane, and 36.4 g of octanol were put into a container, 3.3 g (13.3 mmol) of 2,2'-azobis(2,4-dimethylvaleronitrile) was dissolved therein, and the solution was stirred for 1 hour to prepare an oil phase. Further, separately, an aqueous phase in which 300 g of ion exchange water, 8 g of GH-20, and 8 g of NaCl had been dissolved was prepared. The oil phase was added to the aqueous phase, and the mixed phase was dispersed for 10 minutes at 2,000 rpm by an Excel Auto Homogenizer. Thereafter, the dispersion liquid was transferred to a separable flask, and the reaction container was purged with nitrogen. Polymerization was performed at a reaction temperature of 60° C. for 6 hours. The product was filtered, washed, and dried to obtain 56.8 g of a gel. The obtained gel was dispersed in a mixed liquid of 220 g of diethylene glycol dimethyl ether and 220 g of ethylene glycol, and the dispersion liquid was stirred for 1 hour. After stirring, 2.6 g of a boron trifluoride-diethyl ether complex was added thereto and the mixture was reacted at 80° C. for 3 hours. The mixture was filtered, washed, and dried to obtain 62.5 g of a gel. The obtained gel was classified by a wind power classifier to collect particles in a size of 4 to 8 μm. 20.1 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 22.3 g of the gel of the present invention.

[Example 9] (Degree of Crosslinking: 60%)

41.3 g (125.2 mmol) of polyethylene glycol #200 dimethacrylate (manufactured by Shin-Nakamura Chemical Co., Ltd.), 27.5 g (193.5 mmol) of glycidyl methacrylate, 67.6 g of dichloroethane, and 36.4 g of octanol were put into a container, 3.3 g (13.3 mmol) of 2,2'-azobis(2,4-dimethylvaleronitrile) was dissolved therein, and the solution was stirred for 1 hour to prepare an oil phase. Further, separately, an aqueous phase in which 300 g of ion exchange water, 8 g of GH-20, and 8 g of NaCl had been dissolved was prepared. The oil phase was added to the aqueous phase, and the mixed phase was dispersed for 10 minutes at 2,000 rpm by an Excel Auto Homogenizer. Thereafter, the dispersion liquid was transferred to a separable flask, and the reaction container was purged with nitrogen. Polymerization was performed at a reaction temperature of 60° C. for 6 hours. Then, the dispersion liquid which had been subjected to polymerization was filtered, washed, and dried to obtain 58.4 g of a gel. The obtained gel was dispersed in a mixed liquid of 220 g of diethylene glycol dimethyl ether and 220 g of ethylene glycol, and the dispersion liquid was stirred for 1 hour. After stirring, 2.6 g of a boron trifluoride-diethyl ether complex was added thereto and the mixture was reacted at 80° C. for 3 hours. The mixture was filtered, washed, and dried to obtain 67.4 g of a gel. The obtained gel was classified by a wind power classifier to collect particles in a size of 4 to 8 μm. 23.5 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 25.7 g of the gel of the present invention.

[Example 10] (Degree of Crosslinking: 60%)

41.3 g of a crosslinkable monomer (A-TMM-3L, manufactured by Shin-Nakamura Chemical Co., Ltd., 55% by mass (76.2 mmol) of pentaerythritol triacrylate, 45% by mass (52.6 mmol) of pentaerythritol tetraacrylate), 27.5 g (60.6 mmol) of methoxy polyethylene glycol #400 acrylate (manufactured by Shin-Nakamura Chemical Co., Ltd.) as a non-crosslinkable monomer, 67.6 g of dichloroethane, and 36.4 g of octanol were put into a container, 3.3 g (13.3 mmol) of 2,2'-azobis(2,4-dimethylvaleronitrile) was dissolved therein, and the solution was stirred for 1 hour to prepare an oil phase. Further, separately, an aqueous phase in which 300 g of ion exchange water, 8 g of GH-20, and 8 g of NaCl had been dissolved was prepared. The oil phase was added to the aqueous phase, and the mixed phase was dispersed for 10 minutes at 2,000 rpm by an Excel Auto Homogenizer. Thereafter, the dispersion liquid was transferred to a separable flask, and the reaction container was purged with nitrogen. Polymerization was performed at a reaction temperature of 60° C. for 6 hours. The product was filtered, washed, and dried to obtain 63.7 g of a gel. The obtained gel was dispersed in a mixed liquid of 220 g of diethylene glycol dimethyl ether and 220 g of ethylene glycol, and the dispersion liquid was stirred for 1 hour. After stirring, 2.6 g of a boron trifluoride-diethyl ether complex was added thereto and the mixture was reacted at 80° C. for 3 hours. The mixture was filtered, washed, and dried to obtain 71.1 g of a gel. The obtained gel was classified by a wind power classifier to collect particles in a size of 4 to 8 μm. 26.5 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 29.3 g of the gel of the present invention.

[Example 11] (Degree of Crosslinking: 60%)

41.3 g of a crosslinkable monomer (A-TMM-3L, manufactured by Shin-Nakamura Chemical Co., Ltd., 55% by mass (76.2 mmol) of pentaerythritol triacrylate, 45% by mass (52.6 mmol) of pentaerythritol tetraacrylate), 27.5 g (190.7 mmol) of 4-hydroxybutyl acrylate (manufactured by Nippon Kasei Chemical. Co., Ltd.), 67.6 g of dichloroethane, and 36.4 g of octanol were put into a container, 3.3 g (13.3 mmol) of 2,2'-azobis(2,4-dimethylvaleronitrile) was dissolved therein, and the solution was stirred for 1 hour to prepare an oil phase. Further, separately, an aqueous phase in which 300 g of ion exchange water, 8 g of GH-20, and 8 g of NaCl had been dissolved was prepared. The oil phase was added to the aqueous phase, and the mixed phase was dispersed for 10 minutes at 2,000 rpm by an Excel Auto Homogenizer. Thereafter, the dispersion liquid was transferred to a separable flask, and the reaction container was purged with nitrogen. Polymerization was performed at a reaction temperature of 60° C. for 6 hours. The product was filtered, washed, and dried to obtain 62.5 g of a gel. The obtained gel was dispersed in a mixed liquid of 220 g of diethylene glycol dimethyl ether and 220 g of ethylene glycol, and the dispersion liquid was stirred for 1 hour. After stirring, 2.6 g of a boron trifluoride-diethyl ether complex was added thereto and the mixture was reacted at 80° C. for 3 hours. The mixture was filtered, washed, and dried to obtain 71.5 g of a gel. The obtained gel was classified by a wind power classifier to collect particles in a size of 4 to 8 μm. 27.5 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 29.3 g of the gel of the present invention.

[Example 12] (Degree of Crosslinking: 60%)

41.3 g of a crosslinkable monomer (A-TMM-3L, manufactured by Shin-Nakamura Chemical Co., Ltd., 55% by mass (76.2 mmol) of pentaerythritol triacrylate, 45% by mass (52.6 mmol) of pentaerythritol tetraacrylate), 27.5 g (193.7 mmol) of 4-hydroxybutyl acrylate glycidyl ether (manufactured by Nippon Kasei Chemical. Co., Ltd.), 67.6 g of dichloroethane, and 36.4 g of octanol were put into a container, 3.3 g (13.3 mmol) of 2,2'-azobis(2,4-dimethylvaleronitrile) was dissolved therein, and the solution was stirred for 1 hour to prepare an oil phase. Further, separately, an aqueous phase in which 300 g of ion exchange water, 8 g of GH-20, and 8 g of NaCl had been dissolved was prepared. The oil phase was added to the aqueous phase, and the mixed phase was dispersed for 10 minutes at 2,000 rpm by an Excel Auto Homogenizer. Thereafter, the dispersion liquid was transferred to a separable flask, and the reaction container was purged with nitrogen. Polymerization was performed at a reaction temperature of 60° C. for 6 hours. Then, the dispersion liquid which had been subjected to polymerization was filtered, washed, and dried to obtain 64.5 g of a gel. The obtained gel was dispersed in a mixed liquid of 220 g of diethylene glycol dimethyl ether and 220 g of ethylene glycol, and the dispersion liquid was stirred for 1 hour. After stirring, 2.6 g of a boron trifluoride-diethyl ether complex was added thereto and the mixture was reacted at 80° C. for 3 hours. The mixture was filtered, washed, and dried to obtain 72.3 g of a gel. The obtained gel was classified by a wind power classifier to collect particles in a size of 4 to 8 μm. 28.5 g of the gel after wind power classification was dispersed in a mixed liquid of 220 g of diethylene glycol dimethyl ether and 20 g of glycidol, and the dispersion liquid was stirred for 1 hour. After stirring, 8 g of zinc borofluoride was added thereto and the mixture was reacted at 80° C. for 3 hours. The mixture was filtered, washed, and dried to obtain 30.6 g of the gel of the present invention.

Analysis Example

The gels prepared in Examples and Comparative Examples were charged in a SUS-made housing in 8.0 φ×300 mm, and evaluated by a multi-angle light scattering detector (DAWN HELEOS II, manufactured by Wyatt Technology Inc.). Under the conditions of a flow rate of 1.0 ml/min and a temperature of 30° C., a 0.1 M aqueous sodium nitrate solution was used as an eluent. 10 μL of P-20 which is a 0.5% pullulan standard material (weight-average molecular weight of 20,800 in terms of PS) as a measurement sample was injected, and comparison was performed using the ratio (S/N ratio) of the signal relative to the noise of a baseline. S represents the height of the peak of the obtained sample, and N represents the average value of the noise in the vicinity (+2 minutes) of the peak. That is, the average value of the differences between the peaks and valleys was taken as a comparative value.

Figure 1:
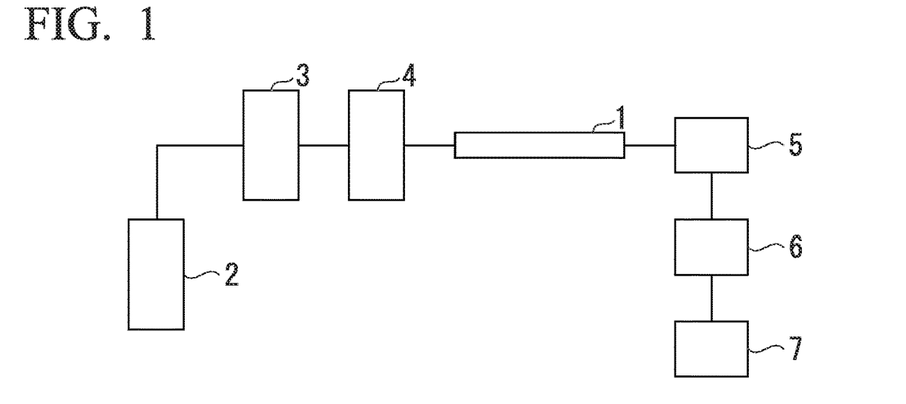
FIG. 1 shows an example of a configuration of a device at the time of performing analysis using a packing material for liquid chromatography of the present invention.
Figure 2:
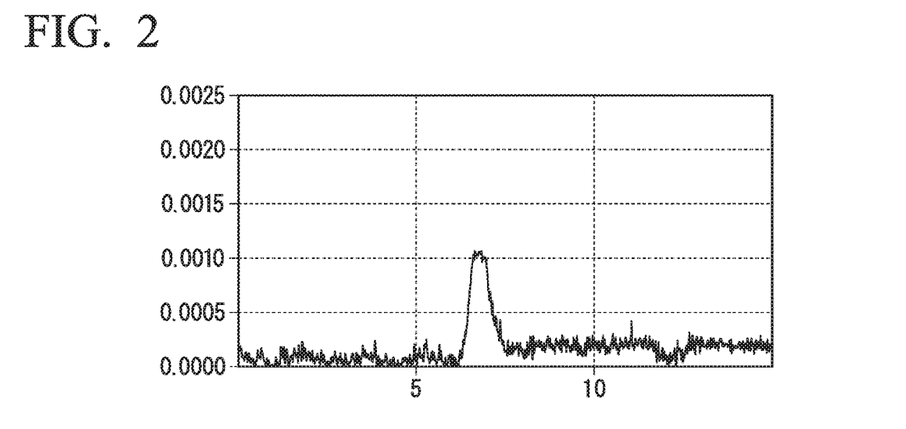
FIG. 2 shows the chromatogram of Comparative Example 1.
Figure 3:
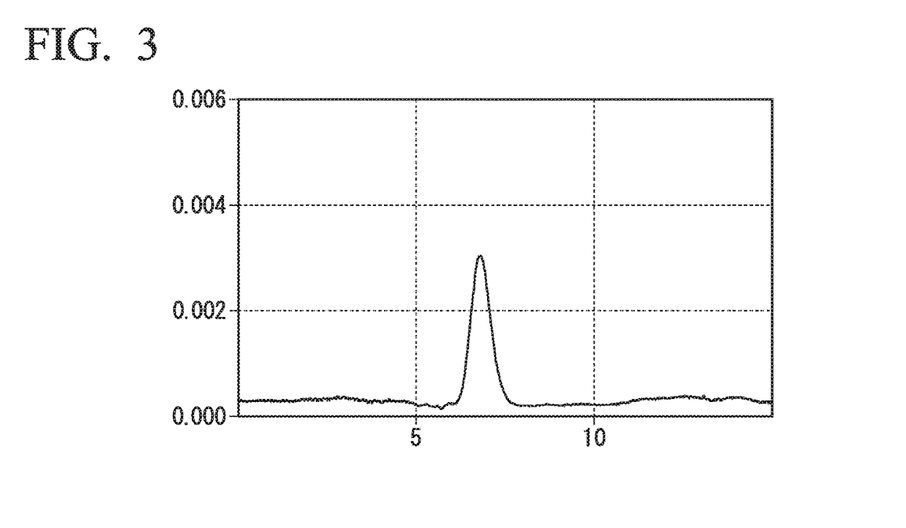
FIG. 3 shows the chromatogram of Example 2.

The chromatogram obtained in Comparative Example 1 is shown in FIG. 2, and the chromatogram obtained in Example 2 is shown in FIG. 3. In these figures, an unit of the vertical axis is mV and an unit of the horizontal axis is minutes.

In addition, the S/N ratio when measurements were performed under the conditions described above using the gels as prepared in Examples 1 to 12 and Comparative Examples 1 and 2 are shown in the table.

In the quantitative analysis, an S/N of 30 or more is preferred, and an S/N of 30 or more is realized in any of Examples 1 to 12.

TABLE 1

| | S/N | Degree of crosslinking | Crosslinkable monomer |
|---|---|---|---|
| Example 1 | 290 | 100% | A-TMM-3L |
| Example 2 | 140 | 60% | A-TMM-3L |
| Example 3 | 41 | 47% | A-TMM-3L |
| Comparative Example 1 | 20 | 30% | A-TMM-3L |
| Comparative Example 2 | 5 | 30% | Ethylene glycol dimethacrylate |
| Example 4 | 62 | 40% | Ethylene glycol dimethacrylate |
| Example 5 | 104 | 50% | Ethylene glycol dimethacrylate |
| Example 6 | 70 | 60% | Glycerin dimethacrylate |
| Example 7 | 83 | 60% | A-TMM-3L |
| Example 8 | 146 | 60% | Polyethylene glycol #200 diacrylate |
| Example 9 | 211 | 60% | Polyethylene glycol #200 dimethacrylate |
| Example 10 | 157 | 60% | A-TMM-3L |
| Example 11 | 118 | 60% | A-TMM-3L |
| Example 12 | 130 | 60% | A-TMM-3L |

INDUSTRIAL APPLICABILITY

An object of the present invention is to provide a packing material for liquid chromatography, in which spike noise is hardly generated when a light scattering detector is used in size exclusion liquid chromatography, and an analysis method using the same.

REFERENCE SIGNS LIST

1 Column for liquid chromatography
2 Mobile phase tank
3 Liquid transporting pump
4 Sampler (injector)
5 Light scattering detector
6 Differential refractive index detector
7 Recorder (data processing device)

The invention claimed is:

1. A packing material for liquid chromatography, which is made of a gel obtained by polymerizing monomers including
    40% by mass or more of a crosslinkable monomer having a (meth)acryloyloxy group, and
    10 to 60% by mass of a non-crosslinkable monomer which consists of a compound having one ethylenic double bond in the molecule thereof, and
wherein the crosslinkable monomer having a (meth)acryloyloxy group is at least one compound represented by the general formula (3):

(3)

(in the formula, $R^6$ represents a (meth)acryloyloxy group or a hydroxyl group, and $R^7$ represents a hydrogen atom or a methyl group),
the non-crosslinkable monomer has a glycidyl group, and
the gel includes
    a first hydroxyl group which is generated by reacting an epoxy group, which is originated from the glycidyl group of the non-crosslinkable monomer, with a polyol or water, and
    a second hydroxyl group which is generated by reacting an epoxy group of glycidol and the first hydroxyl group which is generated by reacting the epoxy group, which is originated from the glycidyl group of the non-crosslinkable monomer, with the polyol or water.

2. The packing material for liquid chromatography according to claim 1,
wherein the non-crosslinkable monomer is a compound represented by the general formula (4):

(4)

(in the formula, $R^8$ represents a hydrogen atom or a methyl group, and Y represents a monovalent organic group having a glycidyl group).

3. A size exclusion liquid chromatography comprising:
introducing a sample capable of being dissolved in an aqueous solvent into a column filled with a packing material for liquid chromatography according to claim 1 to perform detection using a light scattering detector, wherein the packing material includes the gel according to claim 1.

4. The packing material for liquid chromatography according to claim 1,
wherein the gel is a porous polymer gel and the volume-average particle diameter of the packing material is 1 to 500 microns.

5. The packing material for liquid chromatography according to claim 1,
wherein the gel is a hydrophilic gel, the content of the crosslinkable monomer is 50% by mass or more, and the content of the non-crosslinkable monomer is 10 to 50% by mass.

6. The packing material for liquid chromatography according to claim 1,
wherein the crosslinkable monomer includes at least one selected from the group consisting of pentaerythritol triacrylate and pentaerythritol tetraacrylate.

7. A liquid chromatography device, comprising:
the packing material for liquid chromatography according to claim 1;
a column including the packing material;
a pump which transports a liquid to the column;
a detector which analyzes the components eluted from the column; and
a device which processes the data detected from the detector.

8. The packing material for liquid chromatography according to claim 1, wherein the non-crosslinkable monomer is glycidyl methacrylate.

9. The packing material for liquid chromatography according to claim 1, wherein, when a content in % by mass of the crosslinkable monomer with respect to all monomers as a raw material of the gel is referred to as a degree of crosslinking, the degree of crosslinking of the gel is 60% by mass or more, and the content of the non-crosslinkable monomer is 10 to 40% by mass.

10. A packing material for liquid chromatography, which is made of a gel obtained by polymerizing monomers including 40% by mass or more of a crosslinkable monomer having a (meth)acryloyloxy group, wherein
    the crosslinkable monomer having a (meth)acryloyloxy group is an ester of a pentaerythritol and a (meth)acrylic acid,
    the ester of a pentaerythritol and a (meth)acrylic acid includes pentaerythritol tri(meth)acrylate,
    the polymerizing monomers includes less than 60% by mass of a non-crosslinkable monomer which consists of a compound having one ethylenic double bond in the molecule thereof, when a content in % by mass of the crosslinkable monomer with respect to all monomers as a raw material of the gel is referred to as a degree of crosslinking, the degree of crosslinking of the gel is 40% by mass to 95% by mass, the non-crosslinkable monomer has a glycidyl group, the gel includes a first hydroxyl group which is generated by reacting an epoxy group, which is originated from the glycidyl group of the non-crosslinkable monomer, with a polyol or water, the crosslinkable monomer is selected from the group consisting of pentaerythritol triacrylate and a mixture of pentaerythritol triacrylate and pentaerythritol tetraacrylate.

11. The packing material for liquid chromatography according to claim 10, wherein the gel includes the first hydroxyl group which is generated by reacting the epoxy group, which is originated from the glycidyl group of the non-crosslinkable monomer, with the polyol or water, and a second hydroxyl group which is generated by reacting an epoxy group of glycidol and the first hydroxyl group which is generated by reacting the epoxy group, which is originated from the glycidyl group of the non-crosslinkable monomer, with the polyol or water.

12. The packing material for liquid chromatography according to claim 1, wherein the crosslinkable monomer having a (meth)acryloyloxy group is at least one selected from the group consisting of pentaerythritol triacrylate, pentaerythritol tetraacrylate, and a mixture of pentaerythritol triacrylate and pentaerythritol tetraacrylate.

13. The packing material for liquid chromatography according to claim 10, wherein the polymerizing monomers includes pentaerythritol tetraacrylate.

* * * * *